(12) United States Patent
Houlsby et al.

(10) Patent No.: US 8,870,540 B2
(45) Date of Patent: Oct. 28, 2014

(54) WATER TURBINE

(75) Inventors: Guy Tinmouth Houlsby, Oxford (GB); Malcolm Duncan McCulloch, Oxford (GB); Martin Louis Gascoyne Oldfield, Oxford (GB)

(73) Assignee: Isis Innovation Limited, Oxford (GB)

( * ) Notice: Subject to any disclaimer, the term of this patent is extended or adjusted under 35 U.S.C. 154(b) by 1242 days.

(21) Appl. No.: 12/602,455

(22) PCT Filed: May 29, 2008

(86) PCT No.: PCT/GB2008/001812
§ 371 (c)(1),
(2), (4) Date: May 25, 2010

(87) PCT Pub. No.: WO2008/145991
PCT Pub. Date: Dec. 4, 2008

(65) Prior Publication Data
US 2010/0284809 A1    Nov. 11, 2010

(30) Foreign Application Priority Data

May 30, 2007 (GB) .................................. 0710318.7

(51) Int. Cl.
*F03B 7/00* (2006.01)
*F03B 17/06* (2006.01)
*F03B 3/12* (2006.01)

(52) U.S. Cl.
CPC .............. *F03B 3/121* (2013.01); *F03B 17/063* (2013.01); *F05B 2250/31* (2013.01); *F05B 2250/50* (2013.01); *F05B 2240/40* (2013.01); *Y02E 10/28* (2013.01); *F05B 2240/97* (2013.01); *F05B 2250/25* (2013.01); *Y02E 10/223* (2013.01)
USPC ...................................... 416/187; 416/227 A (58) Field of Classification Search
USPC .............. 416/84, 85, 86, 111, 176, 177, 178, 416/187, 197 A, 227 R; 415/4.2, 4.4; 290/43, 44, 54, 55
See application file for complete search history.

(56) References Cited

U.S. PATENT DOCUMENTS

| 70,084 | A | * | 10/1867 | Goodwin | .................. 416/196 R |
|---|---|---|---|---|---|
| 1,100,332 | A | | 6/1914 | Smith | |
| 1,851,680 | A | | 3/1932 | Morris | |
| 1,897,172 | A | * | 2/1933 | Ljungstrom | .................. 416/178 |

(Continued)

FOREIGN PATENT DOCUMENTS

| DE | 2948060 A1 | 6/1981 |
|---|---|---|
| DE | 4124983 A1 | 4/1992 |

(Continued)

OTHER PUBLICATIONS

British Search Report dated Sep. 3, 2007 regarding Application No. GB0710318.7.

*Primary Examiner* — Ninh H Nguyen
(74) *Attorney, Agent, or Firm* — Harness, Dickey & Pierce, P.L.C.

(57) ABSTRACT

A water turbine is disclosed comprising a rotor mounted to be rotatable about an axis. The rotor comprises at least three blades for causing the rotor to rotate about the axis when the blades are located in flowing water. The rotor comprises a plurality of members in the form of a triangulated structure, and at least one of said members comprises one of said blades.

20 Claims, 6 Drawing Sheets

(56) References Cited

U.S. PATENT DOCUMENTS

| | | | |
|---|---|---|---|
| 4,004,427 A | 1/1977 | Butler, Jr. | |
| 4,151,424 A | 4/1979 | Bailey | |
| 4,356,994 A | 11/1982 | Thornton | |
| 4,377,091 A | 3/1983 | DeCarlo et al. | |
| 4,377,373 A * | 3/1983 | Westerhausen | 416/197 A |
| 5,451,137 A * | 9/1995 | Gorlov | 416/178 |
| 5,451,138 A | 9/1995 | Istorik et al. | |
| 5,577,882 A | 11/1996 | Istorik et al. | |
| 5,642,984 A | 7/1997 | Gorlov | |
| 6,036,443 A | 3/2000 | Gorlov | |
| 6,155,892 A | 12/2000 | Gorlov | |
| 7,040,858 B2 * | 5/2006 | Suzuki | 415/4.2 |
| 8,061,993 B2 * | 11/2011 | Sassow | 416/176 |

FOREIGN PATENT DOCUMENTS

| | | |
|---|---|---|
| FR | 2445192 A1 | 7/1980 |
| FR | 2882109 A1 | 8/2006 |
| JP | 2008520894 A | 6/2008 |
| KR | 2000-0024044 A | 5/2000 |
| KR | 2006-0014267 A | 2/2006 |
| RU | 2240443 C1 | 11/2004 |
| RU | 45787 U1 | 5/2005 |
| RU | 2006105624 A | 8/2006 |
| WO | WO-2005010355 A1 | 2/2005 |
| WO | WO-2005050007 A1 | 6/2005 |
| WO | 2006054091 A1 | 5/2006 |
| WO | WO-2007/111532 A1 | 10/2007 |
| WO | WO-2007/129049 A1 | 11/2007 |

* cited by examiner

WATER TURBINE

The invention concerns a type of turbine, designed to extract work from the flow of water, for example for the purpose of generating electrical energy.

A number of devices are now available, or proposed, for extraction of energy from tidal water flow. At one extreme are fixed barriers across estuaries, which are visually and environmentally intrusive. At the other extreme are "point extraction" devices, designed to be deployed in regions of high tidal flow. The latter are "free stream" devices which do not interrupt the flow by creating a continuous barrier. They are the starting point for this development.

Most point extraction devices look superficially like "underwater windmills", i.e. they are axial flow turbines (the axis of rotation of the turbine is parallel or nearly parallel to the direction of the free-stream flow). Typically each turbine has two or three blades, usually of variable pitch. Variants include ducted turbines, and a turbine supported around its perimeter rather than from the axis. One or two turbines are usually mounted on each support structure.

The economics of offshore development are such that there are very considerable fixed costs associated with each installation, with the result that larger devices become more economically viable. For the case of wind turbines, larger devices can be achieved simply by scaling the diameter of the rotor (and the height of the support structure). However, because tidal turbines are limited by the available depth of water, scaling the diameter of a tidal turbine is not possible beyond strict limits. The principal means by which greater power can be developed from axial flow devices is by multiplying the number of devices (and therefore the cost), rather than scaling the size of the device. Thus there are the problems that economies of scale are difficult to achieve; maintenance costs are multiplied; and axial flow turbines are intrinsically expensive to construct and maintain because of features such as variable pitch blades.

One proposed alternative to the axial flow turbine is the transverse flow turbine (the axis of rotation is substantially perpendicular to the flow direction, or at least a major component of the flow direction is perpendicular to the axis of rotation).

Figure 1:
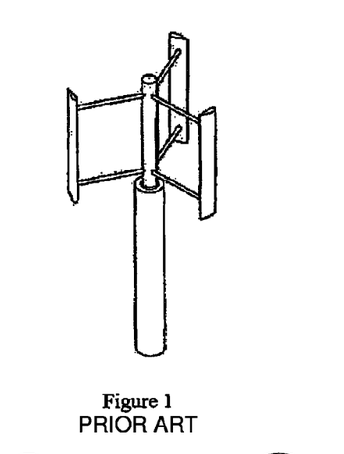
FIG. 1 shows a Darrieus wind turbine.

Transverse flow wind turbines are well known. The simplest is usually known as a Savonius Rotor. A more efficient device is the Darrieus Turbine (patented in 1931), see FIG. 1. It has been used as a wind turbine, almost always with a vertical axis, at a wide range of scales and in the form of a number of variants.

A device based on the same principle as the Darrieus Turbine, but deployed with a vertical axis in water, is known as the Davis Turbine, which dates from about 1980. When deployed with a vertical axis, however, the transverse flow turbine is still not scalable.

Figure 2:
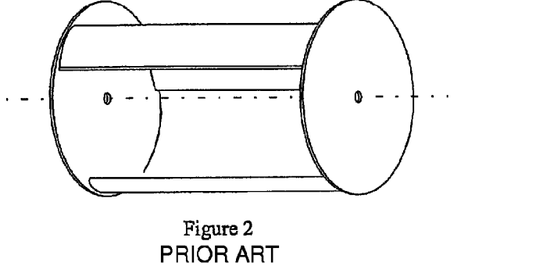
FIG. 2 shows a 3-blade horizontal axis Darrieus turbine not according to the present invention.

One proposal is therefore to deploy a Darrieus (or Davis) type of turbine but with a horizontal axis. The basic form of a 3-blade Darrieus turbine rotor is shown in FIG. 2. If the horizontal-axis Darrieus Turbine is stretched across a flow, the blades become long and narrow (relative to their length). Each blade is subjected to large horizontal forces, which vary dramatically as the turbine rotates. The Darrieus Turbine in this form is inherently a very flexible structure. It resists the applied loads by the development of bending moments and shear forces in the blades. The result is that a long Darrieus Turbine would be subject to unreasonably large deflections.

Figure 3:
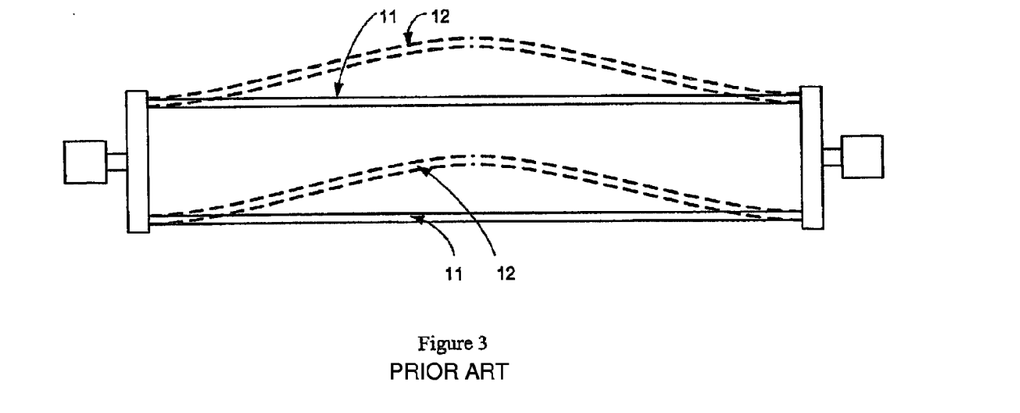
FIG. 3 illustrates deflection of a long 2-blade Darrieus turbine not according to the present invention.

The modes of deformation of the Darrieus structure, and a discussion of the deflection problem is now given. FIG. 3 shows a plan view of a 2-blade Darrieus turbine. Under the lateral loading from hydrodynamic forces, the blades 11, supported at their ends, would deform as illustrated in the Figure by dashed lines 12 (the magnitude of the deformation is exaggerated for illustrative purposes).

Figure 4:
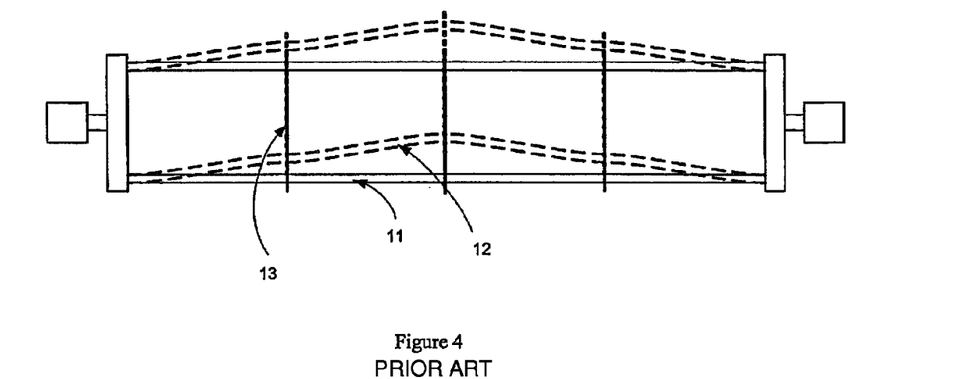
FIG. 4 illustrates deflection of a long 2-blade Darrieus turbine with stiffened sections, not according to the present invention.

The deflection can be reduced by introducing stiff reinforcing planes 13 at sections along the turbine, as shown in FIG. 4. These suppress the "bending deflection" of the overall structure, but do not suppress the "shear deflection". The overall deformation would still be large, as illustrated in FIG. 4.

As well as the problem of the magnitude of the deflections discussed above, there is also the problem that because the deflections vary as the turbine rotates, the materials would suffer extreme fatigue loading. Therefore there is the problem of designing a satisfactory large horizontal axis turbine.

Figure 5:
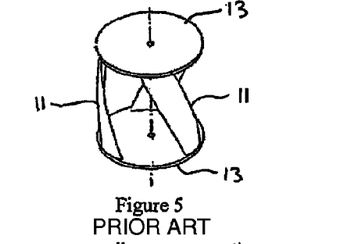
FIG. 5 shows a Gorlov helical turbine not according to the present invention.

A further proposed structure is the Gorlov turbine, which is a variant of the Darrieus turbine but with helical blades (this offers the advantage of more continuous power production). An example of a rotor of a Gorlov turbine is shown in FIG. 5. Gorlov devices have been suggested both as wind and water driven turbines, with vertical or horizontal axes. Further information can be obtained from, for example, U.S. Pat. No. 5,642,984. In some cases (as illustrated in FIG. 5) the blades 11 are supported by end plates 13, in other cases by spokes from a central shaft. However, the helical blades do not form an intrinsically stiff structure, but rely on their bending stiffness for structural integrity. This means that the blades cannot be stretched into particularly long structures without encountering the deflection problems discussed above. There is also the problem that helical blades are intrinsically difficult and expensive to make.

The present invention aims to alleviate, at least partially, one or more of the above problems.

The present invention provides a transverse flow water turbine comprising a rotor mounted to be rotatable about an axis, the rotor comprising at least three blades for causing the rotor to rotate about the axis when the blades are located in flowing water, wherein the rotor comprises a plurality of members in the form of a structure triangulated in three dimensions, wherein at least one of said blades comprises one of said members, wherein said at least one blade is elongate and has a line that is substantially straight, and wherein the line of said at least one blade is not parallel to said axis and is arranged such that the line of the blade and the axis do not lie in a common plane.

The turbine according to the invention has the advantage that it allows scalability of a device by enabling it to be stretched horizontally.

Embodiments of the invention address the deflection problem by providing a three-dimensional triangulated structure, i.e. a non-planar stiff structure that carries the loads mainly by compression and tension. A triangulated structure is preferably an assembly of substantially straight members; if these were to be replaced by members that were joined at their end by "pinned" joints (i.e. joints that do not resist moments) then the equivalent structure would be statically determinate or redundant. It would not form a mechanism. In the real structure, in which the joints can transmit moments, the loads in the structure will nevertheless be principally axial, and the structure will be stiff because of the inherent bracing of the triangulated form. In one preferred embodiment of the invention, the number of blades is six and the blades are angled relative to the rotation axis. In contrast a Darrieus type turbine usually consists of two or three parallel blades (the Davis turbine is usually 4 blades) that are not triangulated. In the present invention, the blades themselves are used to form components of a stiff structure, suppressing the main causes of deformation of the structure under lateral load.

Arranging the line of a substantially straight turbine blade and the rotation axis of the turbine such that they do not lie in a common plane enables embodiments of the invention to be constructed in which one or more blades of the turbine are integral structural members of the three dimensional triangulated structure such that additional bracing is not necessarily required.

Embodiments of the invention will now be described, by way of example only, with reference to the accompanying drawings in which.

In the drawings, like parts are indicated by like reference numerals.

The principal application envisaged for embodiments of the invention is to extract energy from tidal flows, but the device could equally be deployed in other types of flow, e.g. in rivers, or in flows caused by oceanic currents. Hereinafter reference will only be made to tidal flows by way of an example, but this is merely the preferred deployment and does not preclude deployment in other flow locations.

First Embodiment

Figure 6:
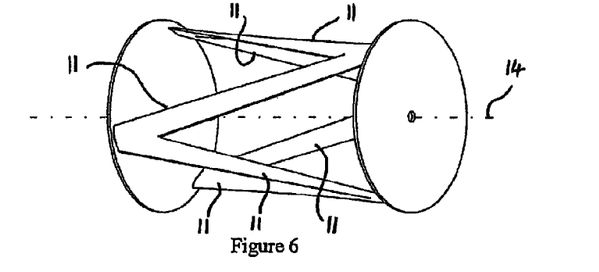
FIG. 6 shows a 6-blade turbine, with blades forming a triangulated structure, according to an embodiment of the invention.

A turbine of a first embodiment of the invention is shown in FIG. 6. In comparison with the turbine rotor of FIG. 2, the number of blades is increased to six and the blades 11 are realigned to form a triangulated structure. FIG. 6 shows one unit of a structure. Note how the blades 11 themselves are elongate members used to form the triangulated structure. In this case, the blades are not parallel to the rotation axis 14 of the rotor. Furthermore, the blades 11 are not inclined radially with respect to the axis 14, but are inclined tangentially, such that the longitudinal line of the blades 11 and the axis 14 of the rotor do not share a common plane. In this way the blades 11 form members of a structure triangulated in three dimensions. Of course, the blades could additionally be radially inclined, for example if the rotor were to be tapered at an end. Several units can be attached together to form a continuous structure, as illustrated for three units in FIG. 7. Although the units are shown as having equal diameter and equal length, this is not essential. For example, the diameter can be greater in regions of deeper water. There is no particular constraint on the diameter of the turbine, but typically it might be 20 m when for use in 60 to 80 m depth of water. Much smaller versions are, of course, possible.

Figure 7:
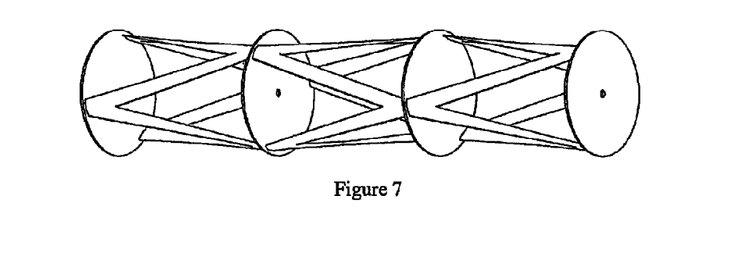
FIG. 7 shows a multiple-unit 6-blade configuration, according to an embodiment of the invention.

The number of blades of the turbine is defined by considering a plane perpendicular to the axis of the turbine rotor that intercepts the greatest number of blades associated with that axis; that number gives the number of blades. Thus FIG. 7 is still considered a six-blade turbine rotor design, even though it is composed of three units each having six distinct blades. Preferably, all of the blades are also members forming at least part of the triangulated structure. However, not all of the members of the triangulated structure are necessarily blades.

The profile of the blades can take any suitable form known for a Darrieus turbine. For example, usually the blades have an aerofoil shape in transverse cross-section, with the aerofoil being symmetric i.e. with the profiles of the opposite faces being the same.

In the present embodiment the blades are substantially straight, and define a straight line along their length. Optionally, the aerofoil profile of the blades can be twisted (while the line of the longitudinal direction of the blade remains substantially straight) for optimal hydrodynamic efficiency, such that the radial direction from the axis of rotation is perpendicular to the plane of the blade along its length. However, even in this case, the line of each blade is straight. In one form of construction, each blade has a central straight spar of steel, with an outer shell forming the aerofoil profile, which may be twisted. The shell can be of a light-weight material, such as fibre-glass or other composite material.

Further Embodiments

The significant part of the invention is that the design is triangulated to form a stiff structure using the blades as structural elements. This enables the turbine to be extended across the flow and reduces the number of supports required. Although FIGS. 6 and 7 show straight, twisted blades that intersect on a disc at the end of each unit, and are of equal area and equally inclined to the axis, none of these features are essential to the invention. Other, alternative embodiments and variants on the first embodiment of the invention include:

(a) The blades can be slightly curved. They do not have to be of constant chord width. They will, however, act as compression and tension members for the truss structure (substantially triangulated structure).

Figure 8:
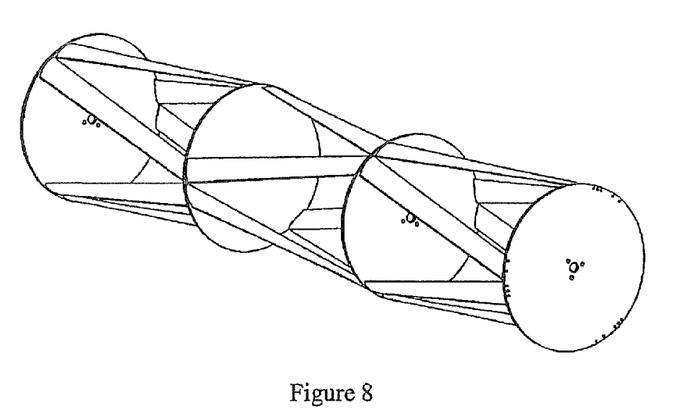
FIG. 8 shows a 6-blade structure embodying the invention with blades offset tangentially.
Figure 9:
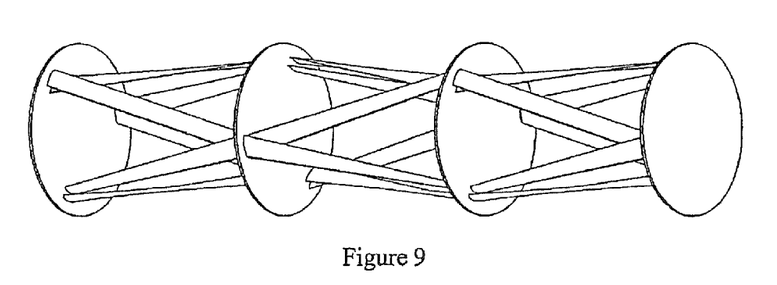
FIG. 9 shows a 6-blade structure embodying the invention with blades offset radially.

(b) The blades can be slightly offset where they meet, as shown in FIG. 8 (tangential offset) and FIG. 9 (radial offset). These designs achieve the basic requirements of a stiff structure, but may be preferred for hydrodynamic reasons.

Figure 10:
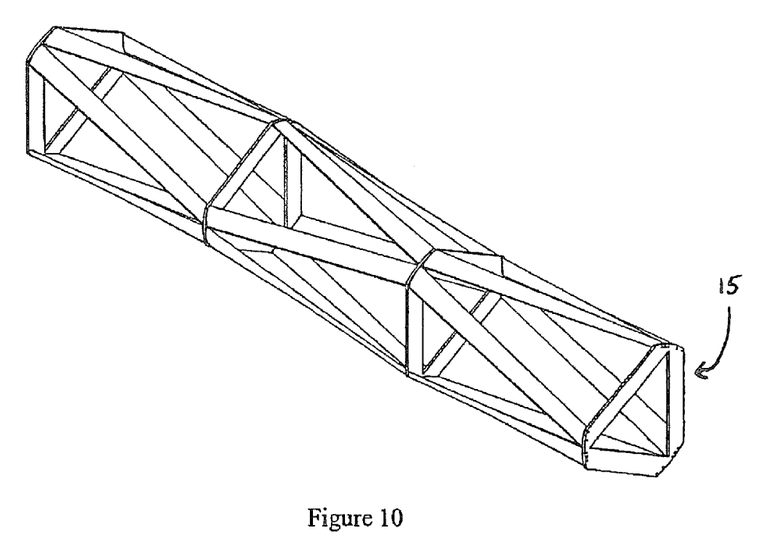
FIG. 10 shows a 6-blade structure embodying the invention with blades offset tangentially and with triangular ends.

(c) They do not have to meet in discs, but could meet on triangular ends 15 as shown in FIG. 10.

Figure 11:
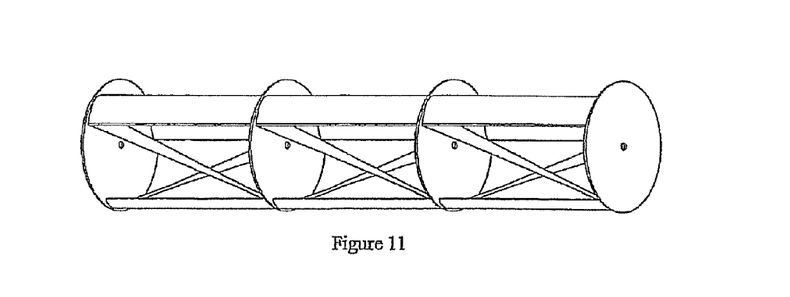
FIG. 11 illustrates an asymmetric 6-blade structure embodying the invention with 3 blades parallel to the axis.

(d) The blades can vary in size and angle to the flow. An example is shown in FIG. 11, where three blades are parallel to the rotation axis and three smaller blades are inclined. They still form a stiff triangulated structure.

(e) The number of blades does not have to be six. For example, a different number of blades could be used, such as eight, subject to the requirement that the turbine comprises a triangulated structure.

Figure 12:
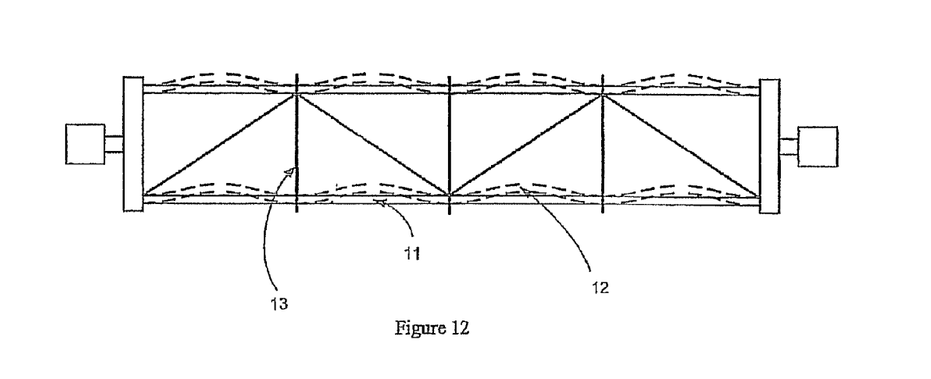
FIG. 12 illustrates deflection of a long, braced 2-blade Darrieus turbine not according to the present invention.

(f) Another method of achieving a stiff triangulated stiff structure is by using at least 3 blades, cross braced with slender tension members, optionally in the form of streamlined-section bars. An illustration of the effect of additional bracing members is given in FIG. 12. This figure is not according to an embodiment of the invention, because it is for a 2-blade turbine and shows bracing only in one plane for clarity, but it is given for comparison with FIGS. 3 and 4. As shown in FIG. 12, the shear deflection of the overall structure becomes much smaller, and the corresponding deformation is suppressed. The individual blades 11 still deform 12, as illustrated in FIG. 12, but their deflection is much smaller than the previous overall deformation of the structure shown in FIGS. 3 and 4.

Deployment of a Turbine Embodying the Invention

Figure 13:
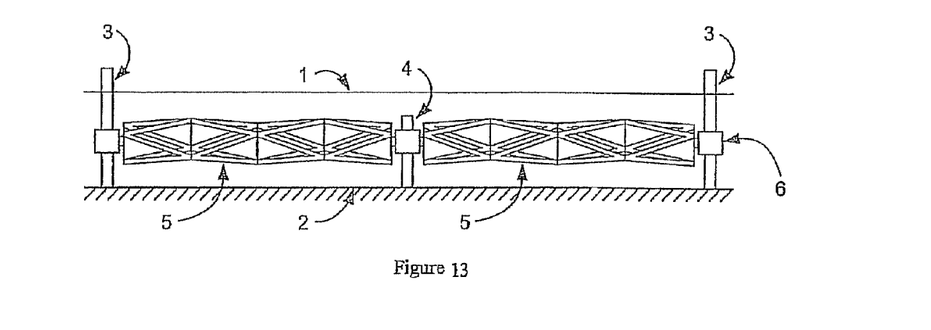
FIG. 13 is an elevation view of a turbine installation embodying the invention.

FIG. 13 shows a typical possible deployment of a turbine embodying the invention. Two turbines rotors 5 are shown, supported by three structures 3, 4 fixed to the seabed 2, two of the structures 3 pierce the water surface 1 and one structure 4 does not. For shipping, wave loading and environmental reasons it can be advantageous to have support structures that do not pierce the surface. The turbine rotors can be connected to separate generators (not shown), or can be coupled together with a single generator 6 in one of the support structures 3. In order to reduce the applied torque on the support structure, adjacent turbine rotors can be counter-rotating. Again, the turbine rotors 5 do not all have to be the same diameter as each other, nor of uniform diameter along their length.

Figure 14:
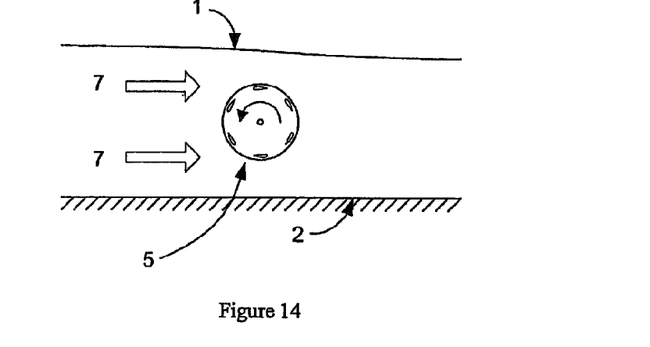
FIG. 14 is a section through the turbine installation of FIG. 13.

FIG. 14 shows a section through the axis of a turbine embodying the invention, showing the water flow 7 transverse to the turbine 5. When the flow reverses in a tidal system, the turbine 5 rotates in the same sense as before: the turbine 5 rotates the same way irrespective of the current direction.

Figure 15:
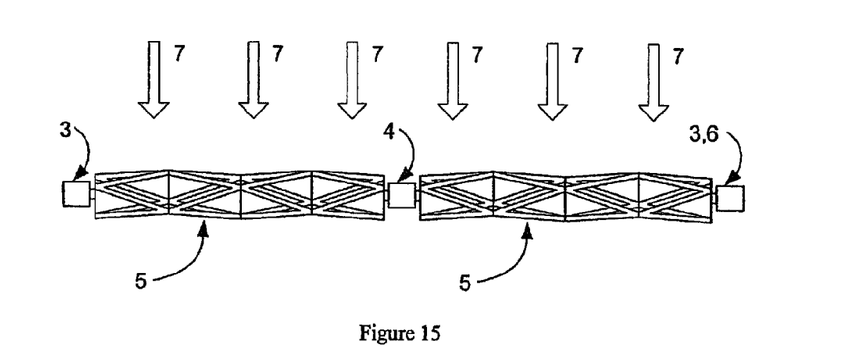
FIG. 15 is a plan view of the turbine installation of FIG. 13.

FIG. 15 shows the same scheme in plan, showing the flow 7 transverse to the turbine 5. The flow need not be exactly in the transverse direction. Inclined flows would, however, cause some loss of efficiency.

Figure 16:
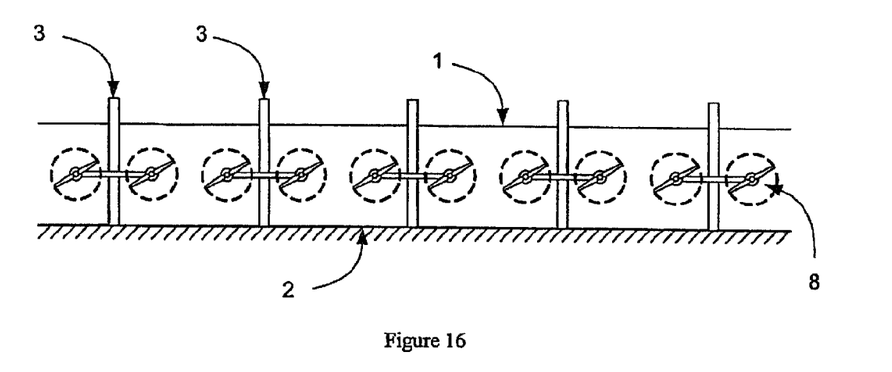
FIG. 16 illustrates a comparable installation of axial flow turbines not according to the invention.

For comparison with FIG. 13, FIG. 16 shows a typical deployment of axial flow turbines 8 occupying a similar breadth across a flow. By comparison with a turbine embodying the invention, the axial flow scheme:

(a) intercepts a smaller cross section of the flow,
(b) requires more support structures, all of which need to be surface-piercing for access to generators,
(c) requires more generators,
(d) requires more primary seals for bearings etc.

Figure 17:
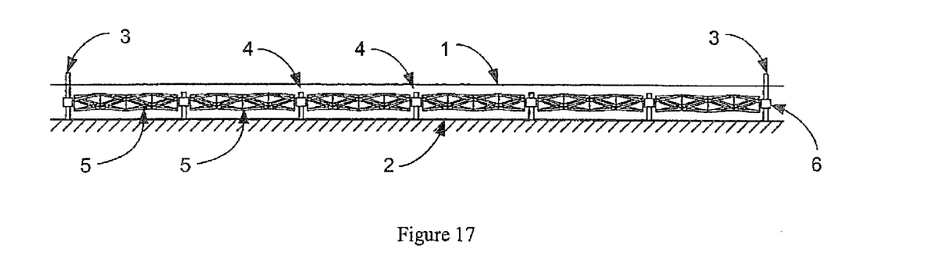
FIG. 17 illustrates a long turbine installation embodying the invention.

In a shallow estuary, for instance, a series of turbines embodying the invention would be coupled together to form a long array as shown in FIG. 17, with one or more generators 6.

Figure 18:
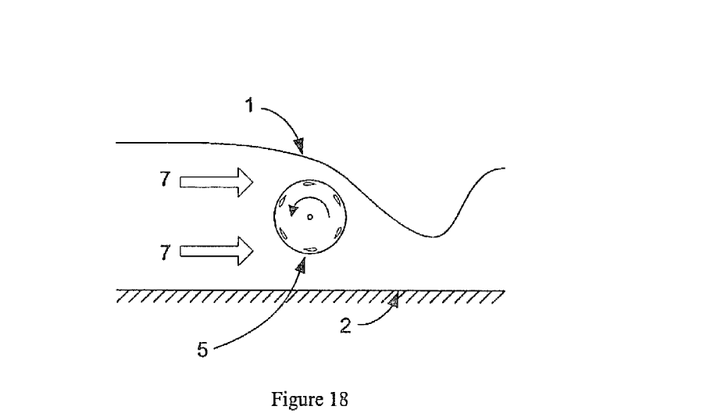
FIG. 18 is a section through a turbine installation as an active weir.

A turbine embodying the invention could also be deployed in higher velocity flows, e.g. in rivers. In appropriate cases the turbine 5 can act as an "active weir", see FIG. 18. Downstream of the weir the flow could become supercritical, followed by a hydraulic jump back to sub-critical flow.

The support structures 3, 4 can take any suitable form. For example, they can be fixed structures with foundations based on monopiles, multiple piles, gravity bases or caissons. The support structure can be of steel or concrete. Tethered buoyant structures may be appropriate in certain applications (e.g. in very deep water).

The generators can also take any of a number of suitable configurations. For example, the generators could be either low angular velocity generators without gears, or higher angular velocity generators with step-up gearboxes between the turbine and generator. There could be one (or even two) generators in each support structure, or the turbine rotors 5 could simply be linked together through the support structure (e.g. using a coupling that would allow slight angular misalignment), and the power take-off could just be at one point along the line. More complex arrangements in which a mechanical transmission system is used to enable the generator to be located above the water line are also envisaged.

The invention claimed is:

1. A transverse flow water turbine comprising a rotor mounted to be rotatable about a substantially horizontal axis, the rotor comprising at least two planes perpendicular to the axis and at least three blades disposed between the at least two planes, each of the at least three blades supported at a first and second end by one of the at least two planes, and the at least three blades causing the rotor to rotate about the axis when the blades are located in flowing water,
    wherein the rotor comprises a plurality of members in the form of a structure triangulated in three dimensions, wherein at least one of said blades comprises one of said members, wherein said at least one blade is elongate and has a line that is substantially straight, wherein the line of said at least one blade is not parallel to said axis and is arranged such that the line of the blade and the axis do not lie in a common plane, wherein the plurality of members form a plurality of triangles, and wherein at least one of the plurality of triangles of the structure triangulated in three dimensions comprises one of the at least two planes and two of the at least three blades.

2. A transverse flow water turbine according to claim 1, comprising at least six blades forming members of the triangulated structure.

3. A transverse flow water turbine according to claim 1, wherein each blade is substantially straight.

4. A transverse flow water turbine according to claim 1, wherein at least one blade has an aerofoil profile.

5. A transverse flow water turbine according to claim 1, wherein at least one blade is an aerofoil twisted along its length.

6. A transverse flow water turbine according to claim 1, wherein, at least one location along said axis, a plane perpendicular to said axis is intercepted by at least six members of said triangulated structure.

7. A transverse flow water turbine comprising:
    a rotor mounted to be rotatable about an axis;
    at least three blades mounted to the rotor for causing the rotor to rotate about the axis when the blades are located in flowing water, wherein at least one blade is an aerofoil twisted along its length; and
    a plurality of members included in the rotor and being in the form of a structure triangulated in three dimensions, wherein at least one blade comprises one of the members, wherein the at least one blade is elongate and includes a line that is substantially straight, and wherein the line of the blade is not parallel to the axis and is arranged such that the line of the blade and the axis do not lie in a common plane.

8. A transverse flow water turbine according to claim 7, comprising at least six blades forming members of the triangulated structure.

9. A transverse flow water turbine according to claim 7, wherein each blade is substantially straight.

10. A transverse flow water turbine according to claim 7, wherein at least one blade has an aerofoil profile.

11. A transverse flow water turbine according to claim 7, wherein said axis is substantially horizontal.

12. A transverse flow water turbine according to claim 7, wherein, at least one location along said axis, a plane perpendicular to said axis is intercepted by at least six members of said triangulated structure.

13. A transverse flow water turbine according to claim 12, wherein the plurality of members form a plurality of triangles, and wherein at least one of the plurality of triangles of the structure triangulated in three dimensions comprises one of the at least two planes and two of the at least three blades.

14. A transverse flow water turbine according to claim 7, wherein the rotor includes at least two planes perpendicular to the axis and the at least three blades disposed between the at least two planes, each of the at least three blades supported at a first and second end by one of the at least two planes.

15. A transverse flow water turbine comprising a rotor mounted to be rotatable about a substantially horizontal axis, the rotor comprising at least two planes perpendicular to the axis and at least three blades disposed between the at least two planes, the at least three blades causing the rotor to rotate about the axis when the rotor is located beneath the surface of flowing water,
wherein the rotor comprises a plurality of members in the form of a structure triangulated in three dimensions, wherein at least one of said blades comprises one of said members, wherein said at least one blade is elongate and has a line that is substantially straight, wherein the line of said at least one blade is not parallel to said axis, wherein the plurality of members form a plurality of triangles, and wherein at least one of the plurality of triangles comprises one of the at least two planes and two of the at least three blades.

16. A transverse flow water turbine according to claim 15, wherein each of the at least three blades is supported at a first end and a second end by one of the at least two planes.

17. A transverse flow water turbine according to claim 16, wherein, the first end of a first of the at least three blades is engaged with the first end of a second of the at least three blades on one of the at least two planes, and the second end of the second of the at least three blades is engaged with the second end of a third of the at least three blades on the other of the at least two planes.

18. A transverse flow water turbine according to claim 15, wherein the line of said at least one blade and the axis do not lie in a common plane.

19. A transverse flow water turbine according to claim 15, wherein the blades are located beneath the surface of flowing water.

20. A transverse flow water turbine according to claim 15, wherein at least one blade is an aerofoil twisted along its length.

\* \* \* \* \*